US009585064B2

United States Patent
Li et al.

(10) Patent No.: US 9,585,064 B2
(45) Date of Patent: Feb. 28, 2017

(54) METHOD AND APPARATUS FOR NETWORK COGNIZANT UPLINK TRANSMISSIONS DURING IRAT HANDOVERS

(71) Applicant: QUALCOMM Incorporated, San Diego, CA (US)

(72) Inventors: Zhengming Li, San Diego, CA (US); Jin-Sheng Su, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 14/176,897

(22) Filed: Feb. 10, 2014

(65) Prior Publication Data

US 2015/0230137 A1  Aug. 13, 2015

(51) Int. Cl.
*H04L 5/14* (2006.01)
*H04W 36/00* (2009.01)
*H04L 5/00* (2006.01)

(52) U.S. Cl.
CPC ........ *H04W 36/0022* (2013.01); *H04L 5/0055* (2013.01); *H04W 36/0088* (2013.01)

(58) Field of Classification Search
CPC .......................... H04W 36/0022; H04L 5/0055
USPC ............................ 370/294–350; 455/423–436
See application file for complete search history.

(56) References Cited

U.S. PATENT DOCUMENTS

| 2010/0034158 A1 | 2/2010 | Meylan |
| 2012/0082054 A1 | 4/2012 | Gholmieh et al. |
| 2012/0322440 A1* | 12/2012 | Jeong ............... H04W 4/005 455/425 |
| 2013/0034008 A1 | 2/2013 | Kazmi |
| 2013/0223239 A1 | 8/2013 | Yang et al. |

(Continued)

FOREIGN PATENT DOCUMENTS

| WO | 2012/112152 A1 | 8/2012 |
| WO | 2013/120047 A2 | 8/2013 |
| WO | 2013/151545 A1 | 10/2013 |

OTHER PUBLICATIONS

3GPP TS 25.304: "3rd Generation Partnership Project; Technical Specification Group Radio Access Network; User Equipment (UE) procedures in idle mode and procedures for cell reselection in connected mode", Version 11.4.0, Release 11, Sep. 2013, pp. 1-53.

(Continued)

*Primary Examiner* — Iqbal Zaidi
(74) *Attorney, Agent, or Firm* — Arent Fox LLP

(57) ABSTRACT

The present disclosure presents a method and an apparatus for network cognizant uplink transmissions during inter radio access technology (IRAT) handovers. For example, the method may include skipping inter radio access technology (IRAT) measurements during one or more dedicated channel (DCH) measurement occasion (DMO) or idle interval gaps of a transmission timing interval (TTI). The method further includes transmitting data on an uplink from a user equipment (UE) to a network entity during the entire duration of the TTI and determining whether the network entity is decoding the data transmitted on the uplink based on a response received from the network entity. As such, network cognizant uplink transmissions during inter radio access technology (IRAT) handovers may be achieved.

24 Claims, 9 Drawing Sheets

(56) References Cited

U.S. PATENT DOCUMENTS

2013/0260821 A1* 10/2013 Deparis ............ H04W 72/1215
                                                    455/553.1
2013/0273915 A1* 10/2013 Surapaneni ....... H04W 36/0072
                                                    455/436
2013/0308481 A1    11/2013 Kazmi et al.

OTHER PUBLICATIONS

International Search Report and Written Opinion—PCT/US2015/014450—ISA/EPO—May 13, 2015. (13 total pages).

* cited by examiner

METHOD AND APPARATUS FOR NETWORK COGNIZANT UPLINK TRANSMISSIONS DURING IRAT HANDOVERS

BACKGROUND

Aspects of the present disclosure relate generally to wireless communication systems, and more particularly, to inter radio access technology (IRAT) handovers.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

For example, in TD-SCDMA systems, Dedicated Channel (DCH) measurement occasion (DMO) or Idle Interval gaps may be configured by a network to support LTE or GSM measurements by a user equipment (UE) during TD-SCDMA to LTE or TD-SCDMA to GSM handovers when the UE is in connected mode. However, 3GPP Specifications do not specify whether a user equipment (UE) can transmit data on an uplink to a network entity during the DMO or Idle Interval gaps which may result in lower throughput at the UE.

Therefore, there is a desire for a method and an apparatus for network cognizant uplink transmissions during inter radio access technology (IRAT) handovers for improved throughput at UEs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents an example method and apparatus for network cognizant uplink transmissions during inter radio access technology (IRAT) handovers. For example, the present disclosure presents an example method for skipping inter radio access technology (IRAT) measurements during one or more dedicated channel (DCH) measurement occasion (DMO) or idle interval gaps of a transmission timing interval (TTI), wherein the IRAT measurements are performed for handovers from a first RAT to a second RAT. The example method further comprises transmitting data on an uplink from a user equipment (UE) to a network entity during the entire duration of the TTI and determining whether the network entity is decoding the data transmitted on the uplink based on a response received from the network entity.

In an additional aspect, an apparatus for network cognizant uplink transmissions during inter radio access technology (IRAT) handovers is disclosed. The apparatus may include means for skipping inter radio access technology (IRAT) measurements during one or more dedicated channel (DCH) measurement occasion (DMO) or idle interval gaps of a transmission timing interval (TTI), wherein the IRAT measurements are performed for handovers from a first RAT to a second RAT. The apparatus further comprises means for transmitting data on an uplink from a user equipment (UE) to a network entity during the entire duration of the TTI and means for determining whether the network entity is decoding the data transmitted on the uplink based on a response received from the network entity.

In a further aspect, a computer program product for network cognizant uplink transmissions during inter radio access technology (IRAT) handovers is described. The computer program product may include a non-transitory computer-readable medium comprising code executable by a computer for skipping inter radio access technology (IRAT) measurements during one or more dedicated channel (DCH) measurement occasion (DMO) or idle interval gaps of a transmission timing interval (TTI), wherein the IRAT measurements are performed for handovers from a first RAT to a second RAT. The computer program product further comprises transmitting data on an uplink from a user equipment (UE) to a network entity during the entire duration of the TTI and determining whether the network entity is decoding the data transmitted on the uplink based on a response received from the network entity.

Moreover, the present disclosure presents an apparatus for network cognizant uplink transmissions during inter radio access technology (IRAT) handovers. The apparatus may include an IRAT measurement skipping component to skip inter radio access technology (IRAT) measurements during one or more dedicated channel (DCH) measurement occasion (DMO) or idle interval gaps of a transmission timing interval (TTI), wherein the IRAT measurements are performed for handovers from a first RAT to a second RAT. The apparatus further comprises an uplink (UL) data transmitting component to transmit data on an uplink from a user equipment (UE) to a network entity during the entire duration of the TTI and a data decoding determining component to determine whether the network entity is decoding the data transmitted on the uplink based on a response received from the network entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to network cognizant uplink transmissions during inter radio access technology (IRAT) handovers. Specifically, in TD-SCDMA systems, DMO or Idle Interval gaps can be configured by a network to support IRAT measurements, e.g., T2L or T2G measurements, when the UE is in connected mode. However, 3GPP Specifications do not specify whether data can be transmitted on an uplink from the UE to the network during TTIs configured with DMO/Idle Interval gaps, also known as affected TTIs. As a result, network vendors may configure UEs differently. For example, transmitting data on the uplink during affected TTIs or not transmitting data on the uplink during affected TTIs. If the UE transmits data during the affected TTIs and the network does not decode the data transmitted, the performance of the UE may be affected, e.g., reduced throughput at the UE.

According to aspects of the present method and apparatus, network cognizant uplink transmissions during inter radio access technology (IRAT) handovers are described. For example, in an aspect, network cognizant uplink transmissions during inter radio access technology (IRAT) handovers may comprise skipping inter radio access technology (IRAT) measurements during one or more dedicated channel (DCH) measurement occasion (DMO) or idle interval gaps of a transmission timing interval (TTI), transmitting data on an uplink from a user equipment (UE) to a network entity during the entire duration of the TTI, and determining whether the network entity is decoding the data transmitted on the uplink based on a response received from the network entity.

Figure 1:
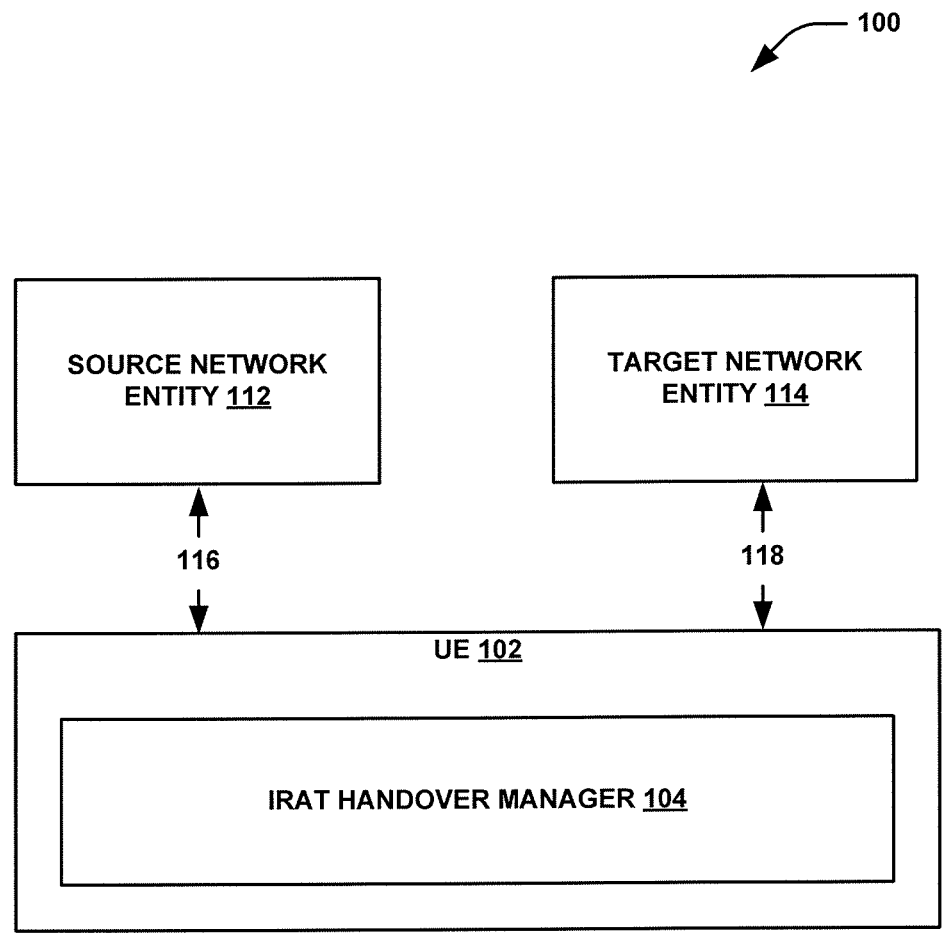
FIG. 1 is a block diagram illustrating an example wireless system of aspects of the present disclosure.

Referring to FIG. 1, a wireless communication system 100 is illustrated that facilitates an inter radio access technology (IRAT) handover. System 100 includes user equipment (UE) 102 that may communicate with one or more network entities, for example, source network entity 112 and/or a target network entity 114, via one or more over-the-air links 116 and/or 118, respectively. In an aspect, UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In an aspect, source network entity 112 and/or target network entity 114 may include, but are not limited to, an access point, a base station (BS) or Node B or eNodeB, a macro cell, a femtocell, a pico cell, a relay, a peer-to-peer device, an authentication, authorization and accounting (AAA) server, a mobile switching center (MSC), etc. Additionally, network entities 112 and/or 114 may include one or more of any type of network component that can enable UE 102 to communicate and/or establish and maintain link 116 and/or 118 to respectively communicate with source network entity 112 and/or target network entity 114. Furthermore, network entity 114 may be a candidate for handover when UE 102 performs a handover. In an example aspect, network entity 112 may operate according to Time Division Synchronous Code Division Multiple Access (TD-SCDMA) and/or network entity 114 may operate according to Long Term Evolution (LTE) or Global System for Mobile Communications (GSM) standard as defined in 3GPP Specifications.

Furthermore, in an aspect, UE 102 may include an IRAT Handover Manager 104 which may be configured for network cognizant uplink transmissions during inter radio access technology (IRAT) handovers by skipping inter radio access technology (IRAT) measurements during one or more dedicated channel (DCH) measurement occasion (DMO) or idle interval gaps wherein the IRAT measurements are performed for handovers from a first RAT to a second RAT, transmitting data on an uplink from a user equipment (UE) to a network entity during the entire duration of a transmission timing interval (TTI) configured with the DMO or the idle interval gaps, and determining whether the network entity is decoding the data transmitted on the uplink based on a response received from the network entity.

In an additional or an optional aspect, UE 102 and/or IRAT Handover Manager 104 may be further configured to suspend transmitting data on the uplink from the UE to the network entity in response to the determining that the network entity is not decoding the data transmitted on the uplink from the UE.

In an additional or an optional aspect, UE 102 and/or IRAT handover manager 104 may be further configured to continue transmitting data on the uplink during the entire duration of TTIs configured with DMO or idle interval gaps in response to determining that the network is decoding data transmitted on the uplink from the UE.

In an additional or optional aspect, UE 102 and/or IRAT handover manager 104 may be further configured to identify whether data is transmitted on a downlink from the network entity to the UE during a TTI configured with DMO or idle interval gaps and/or schedule the IRAT measurements during the entire duration of the TTI configured with DMO or idle interval gaps when no data is transmitted on the downlink during the TTI configured with the DMO or idle interval gaps.

Figure 2:
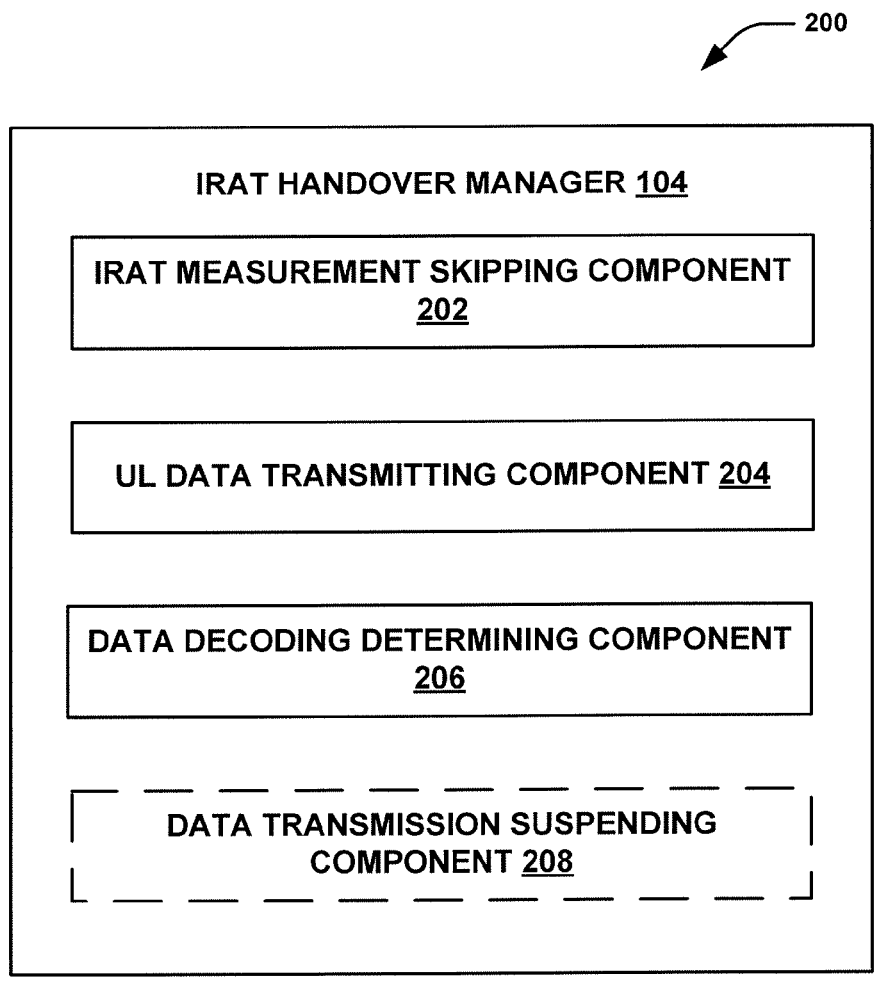
FIG. 2 is a block diagram illustrating an example inter radio access technology (IRAT) handover manager.

FIG. 2 illustrates an example IRAT Handover Manager 104 and various components that may be included in some aspects of IRAT Handover Manager 104 for network cognizant uplink transmissions during inter radio access technology (IRAT) handovers.

For example, in an aspect, IRAT Handover Manager 104 may include one or more of an IRAT Measurement Skipping Component 202, an UL Data Transmitting Component 204, a Data Decoding Determining Component 206, and/or a Data Transmission Suspending Component 208.

In an aspect, when UE 102 is camped on source network entity 112 and operating in TD-SCDMA RAT, the network, e.g., source network entity 112, may configure DMO/Idle Interval gaps for the UE to perform IRAT measurements during the DMO/Idle Interval gaps. But there is no consistency amongst the network operators regarding data transmissions on the uplink from UE 102 to a network entity, e.g., source network entity 112, during the DMO/Idle Interval gaps as the 3GPP Specifications are not clear regarding the transmissions on the uplink during TTIs configured with DMO/Idle Interval gaps. Therefore, some UEs may be configured to transmit data during some or all portions of an affected TTI (e.g., TTI configured with DMO or Idle Interval gaps as described above) and other UEs may be configured not to transmit data at all during an affected TTI. This may result in reduced performance at a UE, for example, reduced throughput at the UE.

In an example aspect, a signaling radio bearer (SRB) with a TTI of 40 ms may configure a DMO/Idle Interval with 80 ms Periodicity and/or offset of 7 for communication between UE 102 and source network entity 112. That is, at least 50% of TTIs of such SRBs may be impacted by DMO/Idle Interval configuration and/or at least one 10 ms time slot is allocated for IRAT measurements for every two TTIs.

In an aspect, IRAT Measurement Skipping Component 202 may be configured to skip inter radio access technology (IRAT) measurements during one or more dedicated channel (DCH) measurement occasion (DMO) or idle interval gaps of a transmission timing interval (TTI). The IRAT measurements are performed by the UE for performing handovers from a first RAT to a second RAT. In an example aspect, first RAT is TD-SCDMA and/or the second RAT is LTE or GSM. In an aspect, UE 102 may skip performing IRAT measurements during one or more DMO or Idle Interval Gaps of a TTI. For example, in order to identify whether the network, e.g., source network entity 112, is decoding data transmitted from the UE on uplink 116 to the network, UE may intentionally skip one or more DMO or Idle Interval gaps and transmit data on the uplink during the whole affected TTI.

In an aspect, the skipping of IRAT measurements during DMO or Idle Intervals Gaps of an affected TTI may not affect IRAT handovers. For example, in some communication technology types (e.g., time division technologies such as TD-SCDMA), particular time slots may be designated with certain predefined communication characteristics. For example, in time division technology, TS0 and/or special slots may generally be utilized to obtain inter/intra frequency measurements at every occurrence within a frame and/or subframe. That is, a user equipment (UE) may obtain inter/intra frequency measurements at every TS0 and/or special time slot occurrence to facilitate, for example, cell reselection and/or handover. As the UE has multiple opportunities for performing IRAT measurements, the UE can safely skip IRAT measurements during several DMO or Idle Interval Gaps.

In an aspect, UL Data Transmitting Component 204 may be configured to transmit data on an uplink from a user equipment (UE) to a network entity during the entire duration of the TTI. For example, in an aspect, once UE 102 skips performing IRAT measurements during DMO or Idle Interval Gaps of an affected TTI, the UE may transmit data on the uplink from the UE to a network entity, e.g., source network entity 112, during the entire duration of the affected TTI. That is, UE transmits data during the entire duration of a TTI, including the time slots (e.g., DMO or Interval gaps) reserved for IRAT measurements.

In an aspect, Data Decoding Determining Component 206 may be configured to determine whether the network entity is decoding the data transmitted on the uplink based on a response received from the network entity. The Decoding Determining Component 206 may determine whether the network entity, e.g., source network entity 112, is decoding data transmitted by the UE on the UL based on response received at the UE from the network entity. For example, in an aspect, the response received at the UE from the network entity may be in the form of ACK or NACK message from the network entity. For example, when the network entity is decoding the messages transmitted from the UE on the UL, the network may respond with an ACK (e.g., acknowledgement) message indicating the network entity is decoding the messages received from the UE on the uplink during affected TTI. In an optional aspect, the network entity may respond with a NACK (e.g., negative acknowledgement) message when the network entity is not decoding the data transmitted on the UL from the UE. Additionally, the network entity may not respond at all and a timer at the UE may expire which may indicated that the network is not decoding data transmitted on the uplink during affected TTIs.

In an optional aspect, Data Transmission Suspending Component 208 may be configured to suspend transmitting data on the uplink from the UE to the network entity in response to the determining that the network entity is not decoding the data transmitted on the uplink from the UE. For example, in an aspect, when it determined that the network entity is not decoding data transmitted on the UL from the UE, for example, based on the response received from the network entity in form of a NACK message, UE 102 may suspend transmitting data on the UL during affected TTIs. In an aspect, this may allow the UE to use the whole of TTI for performing IRAT measurements. In an optional aspect, Data Transmission Suspending Component 208 may be configured to lower data rates such that the UE is not transmitting data on the uplink during affected TTIs.

In an additional aspect, UL Data Transmitting Component 204 may be configured to continue transmitting data on the UL during the entire duration of affected TTIs when it is determined that the network is decoding data transmitted on the UL, for example, based on the response received from the network entity in form of an ACK message. This may improve the overall throughput at the UE as the UE is also transmitting data during affected TTIs.

In an additional or optional aspect, when the UE is not transmitting data on the UL during affected TTIs, the UE may use the entire duration of the TTI for performing IRAT measurements. This may allow the UE to complete IRAT measurements relatively quickly.

Figure 3:
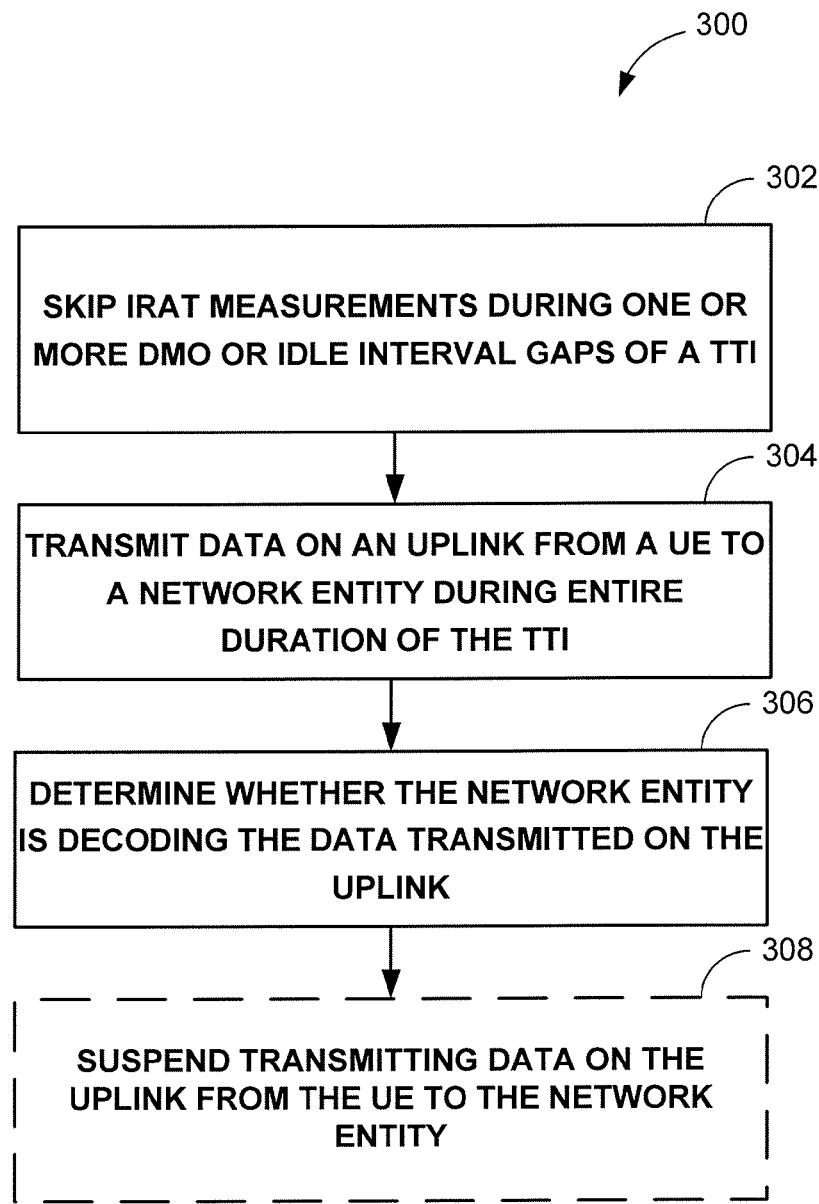
FIG. 3 is an example flow chart for network cognizant uplink transmissions during inter radio access technology (IRAT) handovers.

FIG. 3 illustrates an example methodology 300 for network cognizant uplink transmissions during inter radio access technology (IRAT) handovers. In an aspect, at block 302, methodology 300 may include skipping inter radio access technology (IRAT) measurements during one or more dedicated channel (DCH) measurement occasion (DMO) or idle interval gaps of a transmission timing interval (TTI). For example, in an aspect, IRAT Handover Manager 104 and/or IRAT Measurement Skipping Component 202 may skip inter radio access technology (IRAT) measurements during one or more dedicated channel (DCH) measurement occasion (DMO) or idle interval gaps of a transmission timing interval (TTI). In an additional aspect, the IRAT measurements may be performed for handovers from a first RAT to a second RAT, wherein the first RAT is TD-SCDMA and/or the second RAT is LTE.

Additionally, at block 304, methodology 300 may include transmitting data on an uplink from a user equipment (UE) to a network entity during the entire duration of the TTI. For example, in an aspect, IRAT Handover manager 104 and/or UL Data Transmitting Component 204 may be configured to transmit data on an uplink from a user equipment (UE) to a network entity during the entire duration of the TTI.

Further, at block 306, methodology 300 may include determining whether the network entity is decoding the data transmitted on the uplink based on a response received from the network entity. For example, in an aspect, IRAT Handover Manager 104 and/or Data Decoding Determining Component 206 may be configured to determine whether the network entity is decoding the data transmitted on the uplink based on a response received from the network entity.

In an optional aspect, at block 308, methodology 300 may include suspending transmitting data on the uplink from the UE to the network entity in response to determining that the network entity is not decoding the data transmitted on the uplink from the UE. For example, in an aspect, IRAT Handover Manager 104 and/or Data Transmission Suspending Component 208 may be configured to suspend transmitting data on the uplink from the UE to the network entity in response to determining that the network entity is not decoding the data transmitted on the uplink from the UE.

Figure 4:
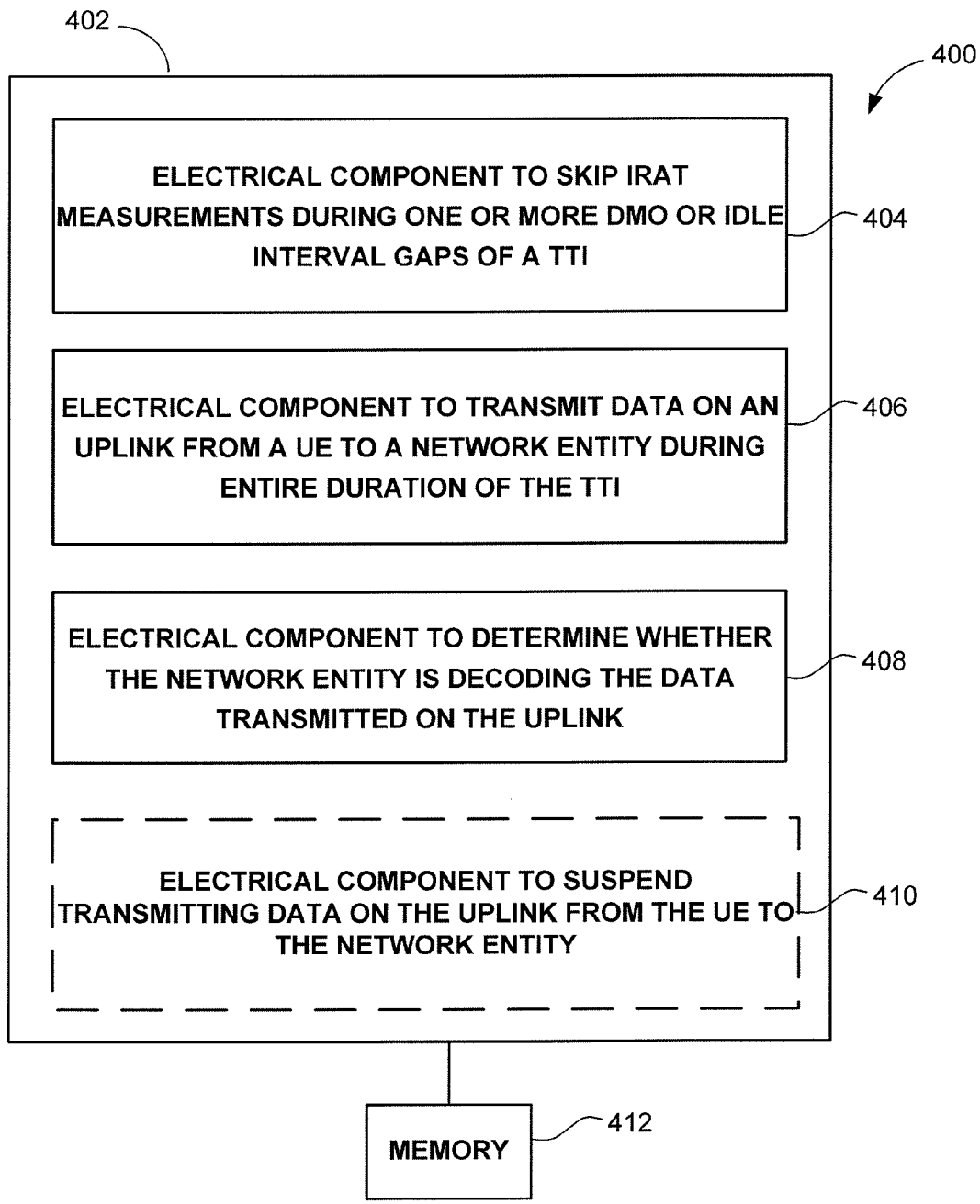
FIG. 4 is a block diagram illustrating aspects of a logical grouping of electrical components as contemplated by the present disclosure.

Referring to FIG. 4, an example system 400 is displayed for network cognizant uplink transmissions during inter radio access technology (IRAT) handovers. For example, system 400 can reside at least partially within a user equipment, for example, UE 102 (FIG. 1) and/or IRAT Handover Manager 104 (FIGS. 1-2). It is to be appreciated that system 400 is represented as including functional blocks, which can be functional blocks that represent functions implemented by a processor, software, or combination thereof (for example, firmware). System 400 includes a logical grouping 402 of electrical components that can act in conjunction. For instance, logical grouping 402 may include an electrical component 404 configured to skip inter radio access technology (IRAT) measurements during one or more dedicated channel (DCH) measurement occasion (DMO) or idle interval gaps of a transmission timing interval (TTI), wherein the IRAT measurements are performed for handovers from a first RAT to a second RAT. In an aspect, electrical component 404 may comprise IRAT Handover Manager 104 (FIGS. 1-2) and/or IRAT Measurement Skipping Component 202 (FIG. 2).

Additionally, logical grouping 402 may include an electrical component 406 configured to transmit data on an uplink from a user equipment (UE) to a network entity during the entire duration of the TTI. In an aspect, electrical component 406 may comprise IRAT Handover Manager 104 (FIGS. 1-2) and/or UL Data Transmitting Component 204 (FIG. 2).

Further, logical grouping 402 may include an electrical component 408 configured to determine whether the network entity is decoding the data transmitted on the uplink based on a response received from the network entity. In an aspect, electrical component 408 may comprise IRAT Handover Manager 104 (FIGS. 1-2) and/or Data Decoding Determining Component 206 (FIG. 2).

Furthermore, logical grouping 402 may optionally include an electrical component 410 configured to suspend transmitting data on the uplink from the UE to the network entity in response to determining that the network entity is not decoding the data transmitted on the uplink from the UE. In an aspect, electrical component 410 may comprise IRAT Handover Manager 104 (FIGS. 1-2) and/or Data Transmission Suspending Component 208 (FIG. 2).

Additionally, system 400 can include a memory 412 that retains instructions for executing functions associated with the electrical components 404, 406, 408, and 410, stores data used or obtained by the electrical components 404, 406, 408, and 410, etc. While shown as being external to memory 412, it is to be understood that one or more of the electrical components 404, 406, 408, and 410 can exist within memory 412. In one example, electrical components 404, 406, 408, and 410 can comprise at least one processor, or each electrical component 404, 406, 408, and 410 can be a corresponding module of at least one processor. Moreover, in an additional or alternative example, electrical components 404, 406, 408, and 410 can be a computer program product including a computer readable medium, where each electrical component 404, 406, 408, and 410 can be corresponding code.

Figure 5:
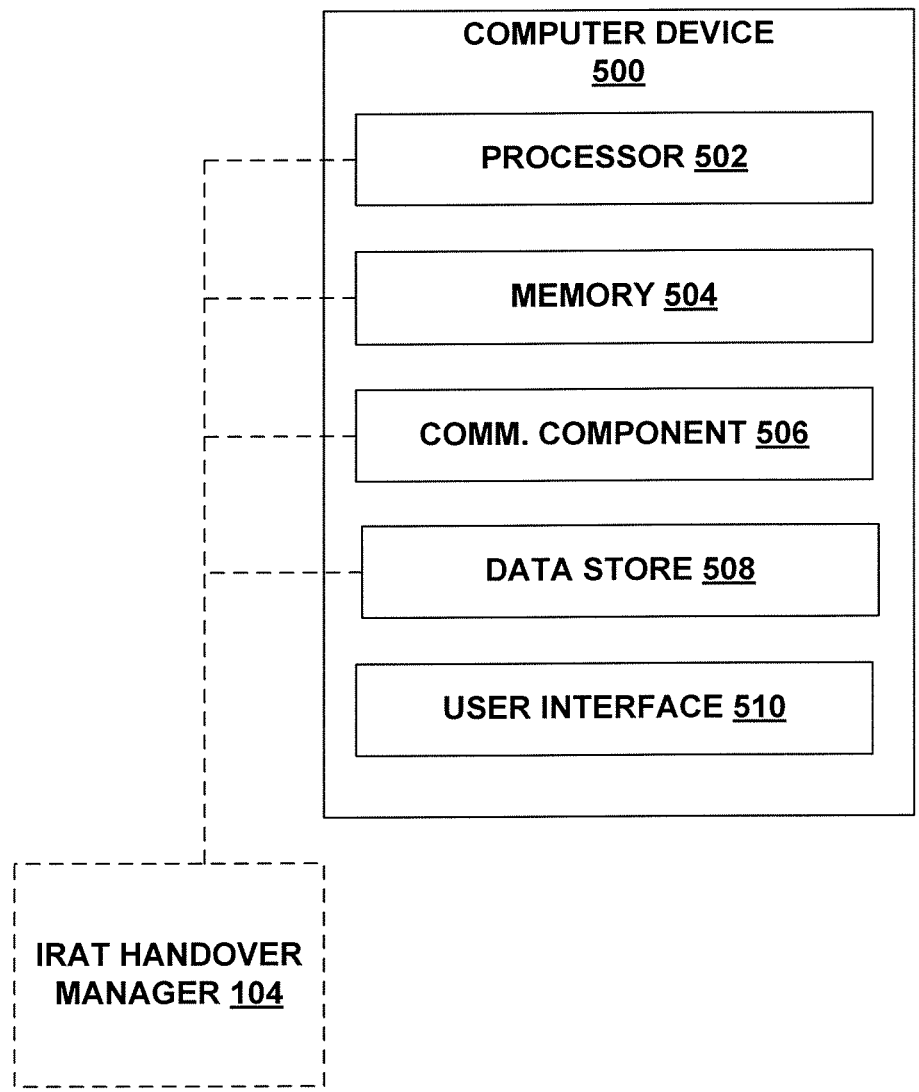
FIG. 5 is a block diagram illustrating aspects of a computer device according to the present disclosure.

Referring to FIG. 5, in one aspect, UE 102 and/or IRAT Handover Manager 104 may be represented by a specially programmed or configured computer device 500. In one aspect of implementation, computer device 500 may include UE 102 and/or IRAT Handover Manager 104 (FIGS. 1-2), such as in specially programmed computer readable instructions or code, firmware, hardware, or some combination thereof. Computer device 500 includes a processor 502 for carrying out processing functions associated with one or more of components and functions described herein. Processor 502 can include a single or multiple set of processors or multi-core processors. Moreover, processor 502 can be implemented as an integrated processing system and/or a distributed processing system.

Computer device 500 further includes a memory 504, such as for storing data used herein and/or local versions of applications being executed by processor 502. Memory 504 can include any type of memory usable by a computer, such as random access memory (RAM), read only memory (ROM), tapes, magnetic discs, optical discs, volatile memory, non-volatile memory, and any combination thereof.

Further, computer device 500 includes a communications component 506 that provides for establishing and maintaining communications with one or more parties utilizing hardware, software, and services as described herein. Communications component 506 may carry communications between components on computer device 500, as well as between computer device 500 and external devices, such as devices located across a communications network and/or devices serially or locally connected to computer device 500. For example, communications component 506 may include one or more buses, and may further include transmit chain components and receive chain components associated with a transmitter and receiver, respectively, or a transceiver, operable for interfacing with external devices. In an additional aspect, communications component 506 may be configured to receive one or more pages from one or more subscriber networks. In a further aspect, such a page may correspond to the second subscription and may be received via the first technology type communication services.

Additionally, computer device 500 may further include a data store 508, which can be any suitable combination of hardware and/or software, that provides for mass storage of information, databases, and programs employed in connection with aspects described herein. For example, data store 508 may be a data repository for applications not currently being executed by processor 502 and/or any threshold values or finger position values.

Computer device 500 may additionally include a user interface component 510 operable to receive inputs from a user of computer device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Figure 6:
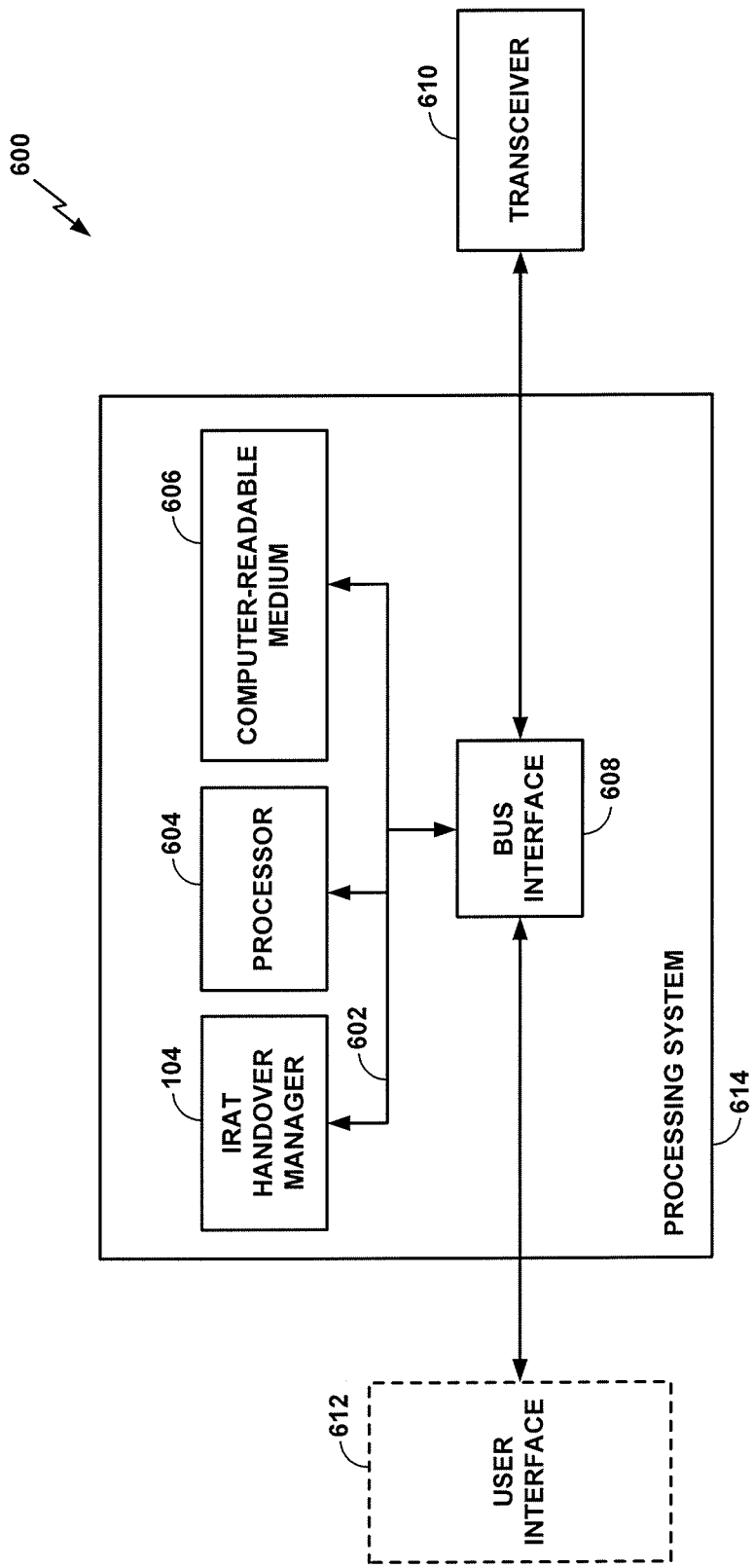
FIG. 6 is a block diagram illustrating an example of a hardware implementation for an apparatus employing a processing system.

FIG. 6 is a block diagram illustrating an example of a hardware implementation for an apparatus 600 including, for example, UE 102 and/or IRAT Handover Manager 104 (FIGS. 1-2), employing a processing system 614 for carrying out aspects of the present disclosure, for example, a method for network cognizant uplink transmissions during inter radio access technology (IRAT) handovers. In this example, the processing system 614 may be implemented with bus architecture, represented generally by a bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, and one or more components described herein, such as, but not limited to, IRAT Handover Manager 104, IRAT Measurement Skipping Component 202, UL Data Transmitting Component 204, Data Decoding Determining Component 206, and/or Data Transmission Suspending Component 208 (FIG. 2). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

Figure 7:
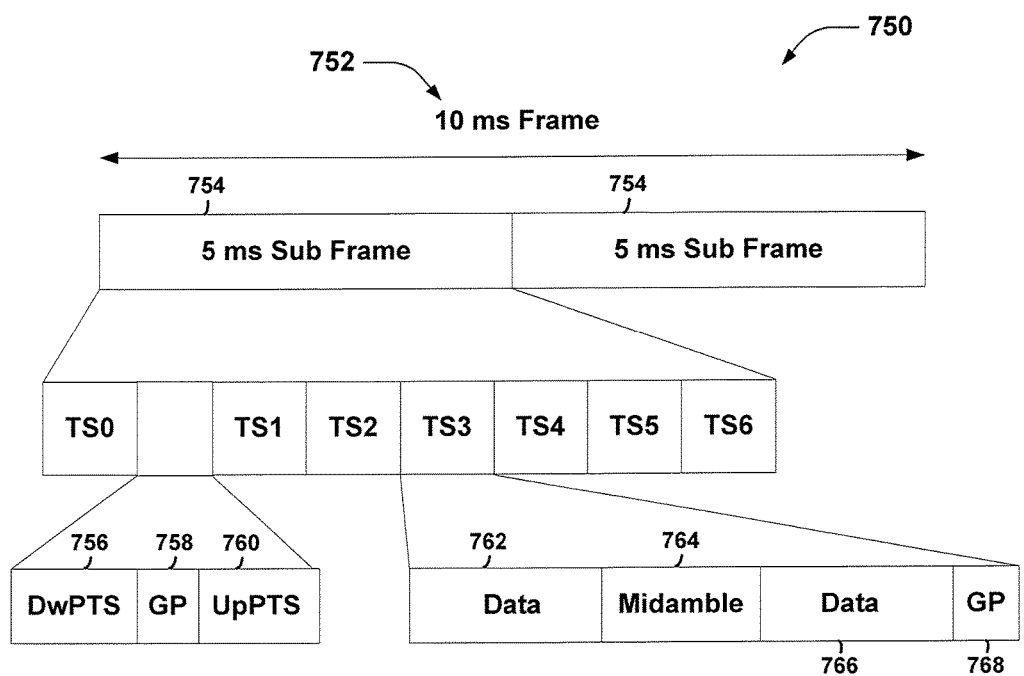
FIG. 7 is a block diagram conceptually illustrating an example of a frame structure in a wireless communication system including an aspect of the user equipment described herein.

FIG. 7 shows a frame structure 750 for a TD-SCDMA carrier, which may be used in communications between UE 102 and first network entity 112, as discussed herein. The TD-SCDMA carrier, as illustrated, has a frame 752 that may be 10 ms in length. The frame 752 may have two 5 ms sub-frames 754, and each of the sub-frames 754 includes seven time slots, TS0 through TS6. The first time slot, TS0, may be allocated for inter/intra frequency measurements and/or downlink communication, while the second time slot, TS1, may be allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 756, a guard period (GP) 758, and an uplink pilot time slot (UpPTS) 760 (also known as the uplink pilot channel (UpPCH)) are located between TS0 and TS1, and may optionally be referred to as a special time slot. Each time slot, TS0-TS6, may allow data transmission multiplexed on a maximum of, for instance, 16 code channels. Data transmission on a code channel includes two data portions 762 separated by a midamble 764 and followed by a guard period (GP) 768. The midamble 764 may be used for features, such as channel estimation, while the GP 768 may be used to avoid inter-burst interference.

Figure 8:
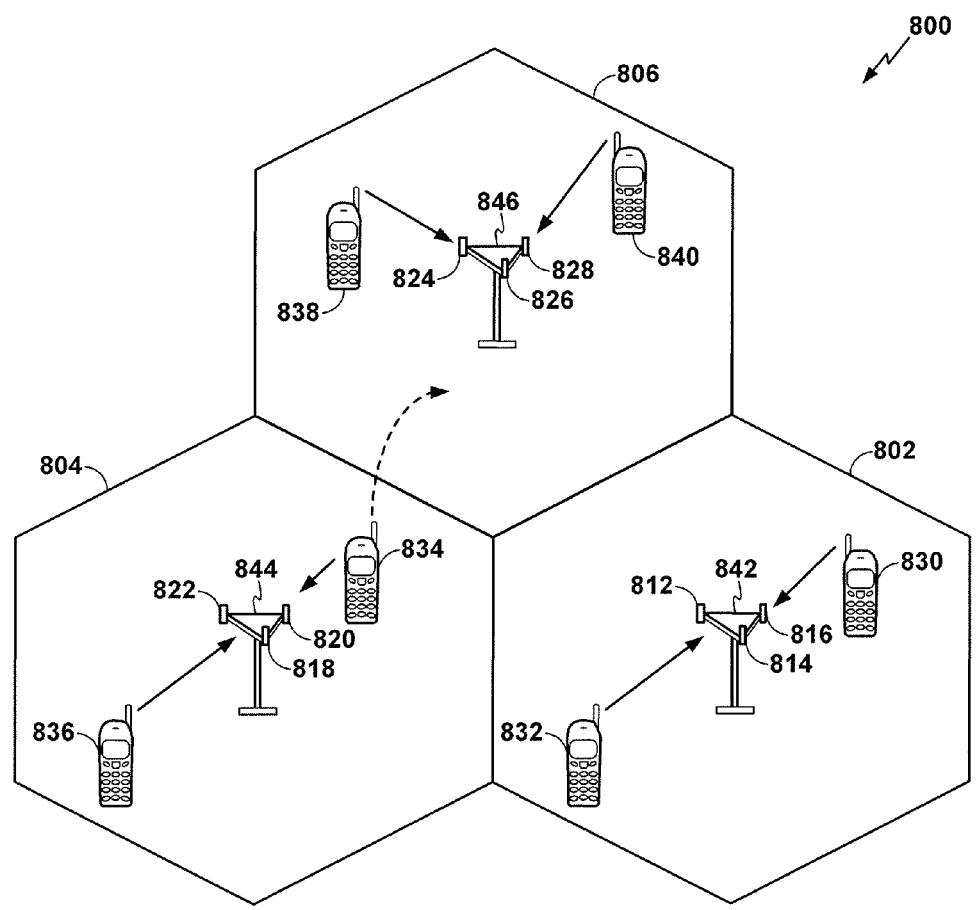
FIG. 8 is a conceptual diagram illustrating an example of an access network.

Referring to FIG. 8, an access network 800 in a UTRAN architecture is illustrated, and may include one or more user equipment (UE) configured to include an IRAT Handover Manager 104 (FIG. 1). The multiple access wireless communication system includes multiple cellular regions (cells), including cells 802, 804, and 806, each of which may include one or more sectors and which may be network entity 112 and/or 114 of FIG. 1. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, for example, including UE 102 of FIG. 1, which may be in communication with one or more sectors of each cell 802, 804 or 806. For example, UEs 830 and 832 may be in communication with NodeB 842, UEs 834 and 836 may be in communication with NodeB 844, and UEs 838 and 840 can be in communication with NodeB 846. Here, each NodeB 842, 844, 846 is configured to provide an access point for all the UEs 830, 832, 834, 836, 838, 840 in the respective cells 802, 804, and 806. Additionally, each NodeB 842, 844, 846 may be network entity 112,114 of FIG. 1, and/or each UE 830, 832, 834, 836, 838, 840 may be UE 102 of FIG. 1, and may perform the methods outlined herein.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at an Enhanced Packet Core, or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set). In any case, UE 834 may execute IRAT Handover Manager 104 to perform the reselection operations described herein.

Further, the modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
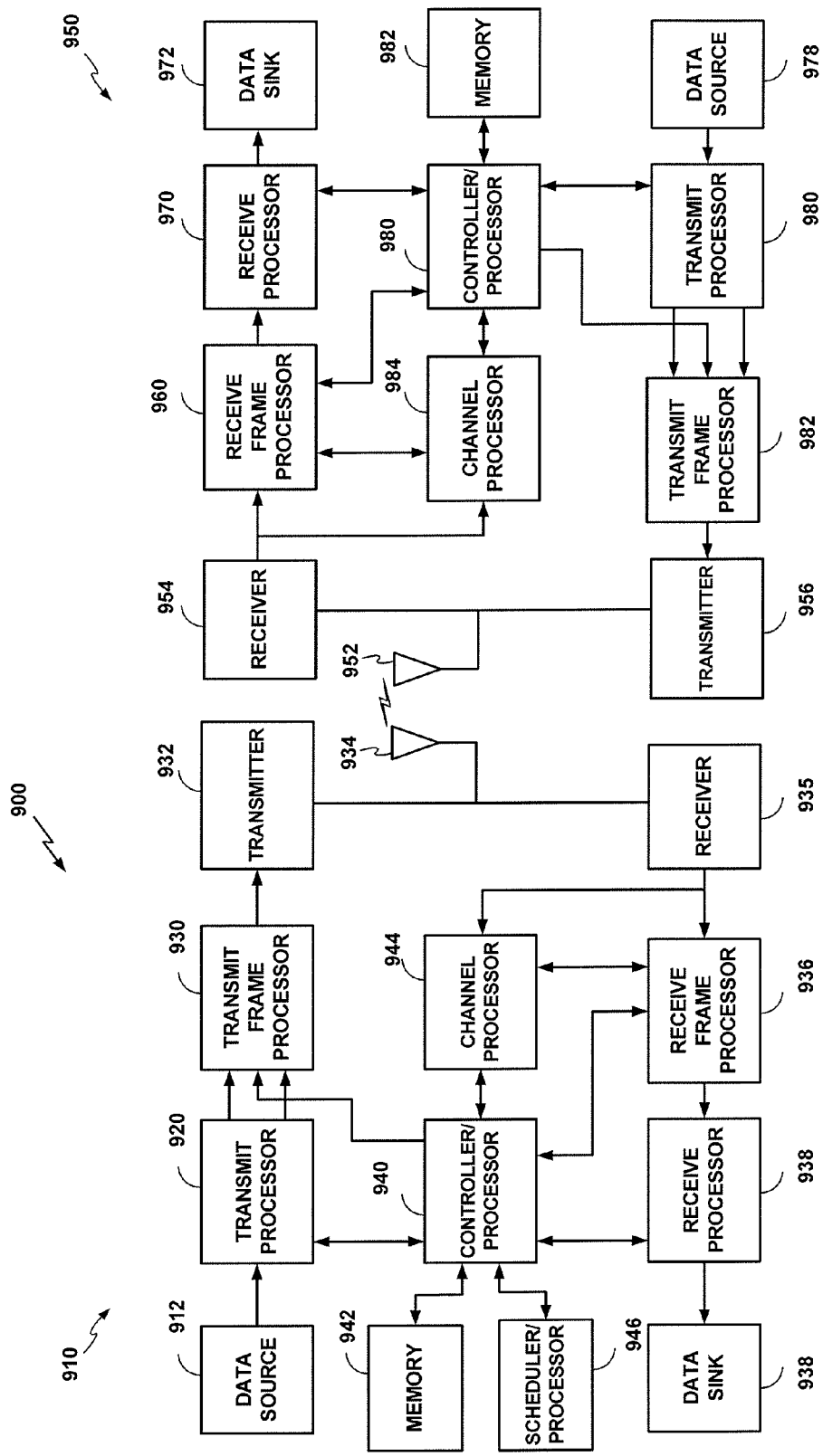
FIG. 9 is a block diagram conceptually illustrating an example of a NodeB in communication with a UE in a telecommunications system.

FIG. 9 is a block diagram of a NodeB 910 in communication with UE 950, where the NodeB 910 may be source network entity 112 and/or target network entity 114, and where UE 950 may be UE 102 that may include an IRAT Handover Manager 104 (FIGS. 1-2). In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the NodeB 910. More specifically, the receive processor 970 descrambles and de-spreads the symbols, and then determines the most likely signal constellation points transmitted by the NodeB 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 890 may also use an acknowledgement (ACK) and/or negative acknowledgement (NACK) protocol to support retransmission requests for those frames.

In the uplink, data from a data source 978 and control signals from the controller/processor 890 are provided to a transmit processor 980. The data source 978 may represent applications running in the UE 950 and various user interfaces (e.g., keyboard). Similar to the functionality described in connection with the downlink transmission by the NodeB 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the NodeB 910 or from feedback contained in the midamble transmitted by the NodeB 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the NodeB 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 880 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the NodeB 910 and the UE 950, respectively. For example, the controller/processors 940 and 990 may provide various functions including timing, peripheral interfaces, voltage regulation, power management, and other control functions. The computer readable media of memories 942 and 992 may store data and software for the NodeB 910 and the UE 950, respectively. A scheduler/processor 946 at the NodeB 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for network cognizant uplink transmissions during inter radio access technology (IRAT) handovers, comprising:
   skipping IRAT measurements during one or more dedicated channel (DCH) measurement occasions (DMOs) or idle interval gaps of a transmission timing interval (TTI) at a user equipment (UE), wherein the IRAT measurements are performed for handovers from a first RAT to a second RAT;
   transmitting of data on an uplink from the UE to a network entity during an entire duration of the TTI at the UE including transmitting during the one or more DMOs or the idle interval gaps of the TTI at the UE; and determining, at the UE, whether the network entity is decoding the data transmitted on the uplink based on a response received at the UE from the network entity.

2. The method of claim 1, further comprising:
suspending the transmitting of the data on the uplink from the UE to the network entity in response to the determining that the network entity is not decoding the data transmitted on the uplink from the UE.

3. The method of claim 1, further comprising:
continuing the transmitting of the data on the uplink during a respective entire duration of one or more other TTIs at the UE configured with the one or more DMOs or the one or more idle interval gaps in response to determining that the network is decoding the data transmitted on the uplink from the UE.

4. The method of claim 1, wherein the response received from the network entity comprises an acknowledgement (ACK) or a negative acknowledgement (NACK) message from the network entity.

5. The method of claim 1, further comprising:
identifying whether downlink data is transmitted on a downlink from the network entity to the UE during at least one other TTI at the UE configured with the one or more DMOs or the one or more idle interval gaps; and
scheduling the IRAT measurements during an entire duration of the at least one other TTI at the UE configured with the one or more DMOs or the one or more idle interval gaps when the downlink data is not transmitted on the downlink during the at least one other TTI at the UE.

6. The method of claim 1, wherein the first RAT is Time Division Synchronous Code Division Multiple Access (TD-SCDMA) and the second RAT is Long Term Evolution (LTE).

7. An apparatus for network cognizant uplink transmissions during inter radio access technology (IRAT) handovers, comprising:
means for skipping IRAT measurements during one or more dedicated channel (DCH) measurement occasions (DMOs) or idle interval gaps of a transmission timing interval (TTI) at a user equipment (UE), wherein the IRAT measurements are performed for handovers from a first RAT to a second RAT;
means for transmitting of data on an uplink from the UE to a network entity during an entire duration of the TTI at the UE including transmitting during the one or more DMOs or the idle interval gaps of the TTI at the UE; and
means for determining, at the UE, whether the network entity is decoding the data transmitted on the uplink based on a response received at the UE from the network entity.

8. The apparatus of claim 7, further comprising:
means for suspending the transmitting of the data on the uplink from the UE to the network entity in response to the determining that the network entity is not decoding the data transmitted on the uplink from the UE.

9. The apparatus of claim 7, further comprising:
means for continuing the transmitting of the data on the uplink during a respective entire duration of one or more other TTIs at the UE configured with the one or more DMOs or the one or more idle interval gaps in response to determining that the network is decoding the data transmitted on the uplink from the UE.

10. The apparatus of claim 7, wherein the response received from the network entity comprises an acknowledgement (ACK) or a negative acknowledgement (NACK) message from the network entity.

11. The apparatus of claim 7, further comprising:
means for identifying whether downlink data is transmitted on a downlink from the network entity to the UE during at least one other TTI at the UE configured with the one or more DMOs or the one or more idle interval gaps; and
scheduling the IRAT measurements during an entire duration of the at least one other TTI at the UE configured with the one or more DMOs or the one or more idle interval gaps when the downlink data is not transmitted on the downlink during the at least one other TTI at the UE.

12. The apparatus of claim 7, wherein the first RAT is Time Division Synchronous Code Division Multiple Access (TD-SCDMA) and the second RAT is Long Term Evolution (LTE).

13. A non-transitory computer readable medium storing computer executable code for network cognizant uplink transmissions during inter radio access technology (IRAT) handovers, comprising:
code for skipping IRAT measurements during one or more dedicated channel (DCH) measurement occasions (DMOs) or idle interval gaps of a transmission timing interval (TTI) at a user equipment (UE), wherein the IRAT measurements are performed for handovers from a first RAT to a second RAT;
code for transmitting of data on an uplink from the UE to a network entity during an entire duration of the TTI at the UE including transmitting during the one or more DMOs or the idle interval gaps of the TTI at the UE; and
code for determining, at the UE, whether the network entity is decoding the data transmitted on the uplink based on a response received at the UE from the network entity.

14. The computer readable medium of claim 13, further comprising:
code for suspending the transmitting of the data on the uplink from the UE to the network entity in response to the determining that the network entity is not decoding the data transmitted on the uplink from the UE.

15. The computer readable medium of claim 13, further comprising:
code for continuing the transmitting of the data on the uplink during a respective entire duration of one or more other TTIs at the UE configured with the one or more other DMOs or the one or more other idle interval gaps in response to determining that the network is decoding the data transmitted on the uplink from the UE.

16. The computer readable medium of claim 13, wherein the response received from the network entity comprises an acknowledgement (ACK) or a negative acknowledgement (NACK) message from the network entity.

17. The computer readable medium of claim 13, further comprising:
code for identifying whether downlink data is transmitted on a downlink from the network entity to the UE during at least one other TTI at the UE configured with the one or more DMOs or the one or more idle interval gaps; and
scheduling the IRAT measurements during an entire duration of the at least one other TTI at the UE configured with the one or more DMOs or the one or more idle interval gaps when the downlink data is not transmitted on the downlink during the at least one other TTI at the UE.

18. The computer readable medium of claim 13, wherein the first RAT is Time Division Synchronous Code Division Multiple Access (TD-SCDMA) and the second RAT is Long Term Evolution (LTE).

19. An apparatus for network cognizant uplink transmissions during inter radio access technology (IRAT) handovers, comprising:
   a memory configured to store data; and
   at least one processor communicatively coupled with the memory, wherein the one at least one processor is configured to:
   skip IRAT measurements during one or more dedicated channel (DCH) measurement occasions (DMOs) or idle interval gaps of a transmission timing interval (TTI) at a user equipment (UE), wherein the IRAT measurements are performed for handovers from a first RAT to a second RAT;
   transmit data on an uplink from the UE to a network entity during an entire duration of the TTI at the UE including transmitting during the one or more DMOs or the idle interval gaps of the TTI at the UE; and
   determine whether the network entity is decoding the data transmitted on the uplink based on a response received at the UE from the network entity.

20. The apparatus of claim 19, wherein the at least one processor is further configured to:
   suspend transmitting of the data on the uplink from the UE to the network entity in response to the determining that the network entity is not decoding the data transmitted on the uplink from the UE.

21. The apparatus of claim 19, wherein the at least one processor is further configured to:
   continue the transmitting of the data on the uplink during a respective entire duration of one or more other TTIs at the UE configured with the one or more DMOs or the one or more idle interval gaps in response to determining that the network is decoding the data transmitted on the uplink from the UE.

22. The apparatus of claim 19, wherein the response received from the network entity comprises an acknowledgement (ACK) or a negative acknowledgement (NACK) message from the network entity.

23. The apparatus of claim 19, wherein the at least one processor is further configured to:
   identify whether downlink data is transmitted on a downlink from the network entity to the UE during at least one other TTI at the UE configured with the one or more DMOs or the one or more idle interval gaps; and
   schedule the IRAT measurements during an entire duration of the at least one other TTI at the UE configured with the one or more DMOs or the one or more idle interval gaps when the downlink data is not transmitted on the downlink during the at least one other TTI at the UE.

24. The apparatus of claim 19, wherein the first RAT is Time Division Synchronous Code Division Multiple Access (TD-SCDMA) and the second RAT is Long Term Evolution (LTE).

* * * * *